United States Patent

[11] 3,554,166

| [72] | Inventor | Dallas J. B. Belden<br>Rte. 1 Box 311, Rochester, Wash. 98579 |
|---|---|---|
| [21] | Appl. No. | 736,644 |
| [22] | Filed | June 13, 1968 |
| [45] | Patented | Jan. 12, 1971 |

[54] UDDER TREATMENT APPARATUS
15 Claims, 4 Drawing Figs.

[52] U.S. Cl. ..................................................... 119/159, 119/1
[51] Int. Cl. ..................................................... A01k 29/00
[50] Field of Search ........................................... 119/1, 158, 159, 28

[56] References Cited
UNITED STATES PATENTS

| 1,055,289 | 3/1913 | Nolan | 119/159 |
| 2,498,946 | 2/1950 | Evans | 119/159 |
| 3,221,708 | 12/1965 | Marley | 119/158 |

*Primary Examiner*—Hugh R. Chamblee
*Attorney*—Christensen, Sanborn & Matthews

ABSTRACT: The mammary region of a dairy animal is treated by washing and stimulating her teats and udder before milking and applying a disinfectant after milking. The apparatus for this treatment includes a spraying unit having a convex dome exterior surface through which the washing, stimulating and disinfecting fluids are sprayed in a pattern covering the entire exposed area of the teats and the adjacent exposed area of the udder. The size of the dome is selected to correspond with the size of the udder so that the dairy animals straddle the dome.

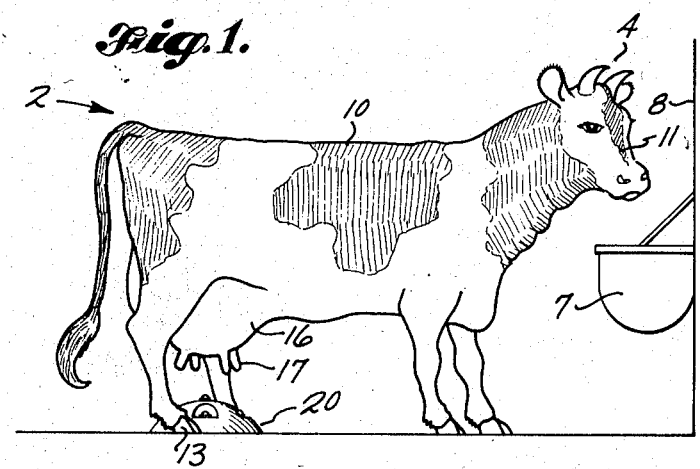
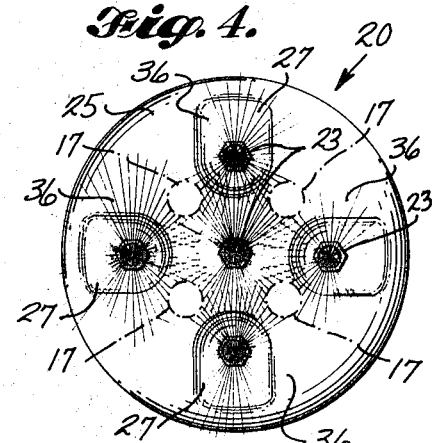
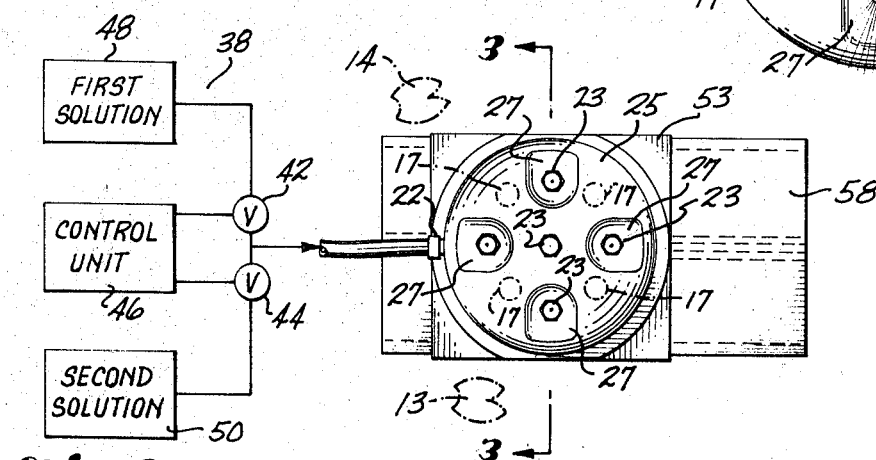
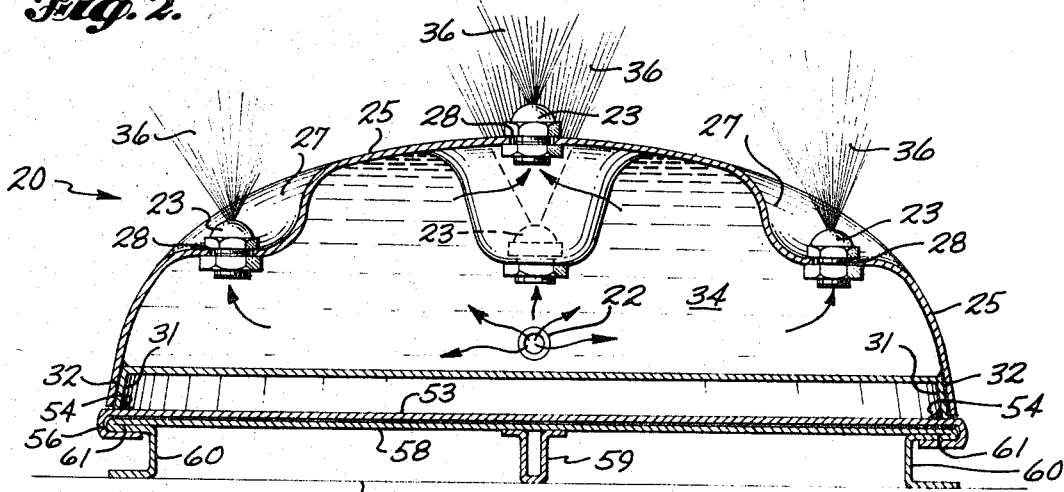
INVENTOR
DALLAS J. B. BELDEN

UDDER TREATMENT APPARATUS

BACKGROUND OF THE INVENTION

1. Field of the Invention

This invention relates to the treatment of dairy animals and more particularly to apparatus and methods for cleaning and sanitizing the mammary region of the animals before and after milking.

2. Description of the Prior Art

Due to increasing health standards, the dairy farm operator in recent years has become quite interested in utilizing effective techniques for insuring that the milk produced is clean and the dairy animals are free from infectious diseases, especially mastitis. While a complete bodily bathing operation of a dairy animal might be possible, the demands for water and expensive labor, along with the difficulty of handling the animals, dictate against any such extensive cleaning treatment. While some operators utilize handheld hose sprays which are directed toward the lower portions of the cows, particularly against the udder, such washing operations are generally not too effective because the animal's legs interfere with the path of the sprayed water and dedicated manual laborers for such operations are difficult to find.

Some installed systems have been developed for cleaning animals such as that shown in the U.S. Pat. to Nolan, 1,055,289, but because the lower spray head is located in the floor it is often blocked by the animal's hooves or the hole in the floor causes the animals to injure their legs. Batch washing of a number of animals at one time in a large room has been used with marginal success with installations such as shown in the patent to Findlay 2,264,201. The reason such a washing room has not proved to be too successful in a dairy operation is that the pattern of nozzles is not appropriate for adequately and effectively cleaning all of the necessary areas of the dairy cow. Another such spraying room for animals is shown in the patent to Marley 3,221,708, wherein a series of conduit pipes are placed across the floor of the washing room to provide water to fieldlike sprinklers which are protected by dome-shaped shields so that the animals will not break the sprinklers or be injured by them. Since the supply conduits and shielded sprinklers are raised above the floor level, the animals have a tendency to trip over the conduits and avoid positioning themselves in the most effective portion of the pattern of the sprinklers.

In the development of a modern dairy barn the patent to Holme 3,246,631 discloses a system for washing and stimulating individual dairy cows by projecting jets of washing and stimulating fluid from opposite sides of preparation stalls leading into the milking stalls of the barn. While such washing techniques are a significant improvement over some of the previous methods noted, they still do not provide the necessary washing of all of the external areas of the individual teats since the legs of the cows interfere with the pattern of the spray as it is injected from the sides of the animals. It is therefore seen that there is a definite need for an easily operated, effective system for washing the teats of dairy cows just prior to their milking operation.

It has also been found that in the operation of a large dairy herd, a significant time savings can be realized by utilization of a system for stimulating the cows' udders so that they are quickly brought to a condition ready for milking and will produce the maximum amount of milk in the least amount of time. One system for providing such stimulation is that described in the previously mentioned patent to Holme. Another system is disclosed in the patent to Shakarian No. 3,301,215 wherein jets of warm air are directed toward the udders of the cows as they are positioned in the milking stall just prior to the hookup of the milking equipment. As shown, however, there is nothing to prevent the animal from blocking the ejecting nozzle and thus deflecting the warm air jet such that it does not reach the udder of the cow to produce the desired stimulation.

OBJECTS AND SUMMARY OF THE INVENTION

It is therefore seen that various techniques and apparatus have been developed over the years for cleaning dairy animals. It should also become apparent, however, from a review of these various prior art techniques and apparatus that they have a number of shortcomings and disadvantages which, to one degree or another, prevent them from providing the necessary sanitizing treatment required for rapid, yet effective, premilking cleaning and postmilking sanitizing of dairy animals.

It is therefore the principal object of the instant invention to provide a generally improved technique and apparatus for effectively cleaning and sanitizing the mammary region of dairy animals.

It is another object of the instant invention to provide an improved spraying unit for washing the desired region of an animal which provides an exterior surface having a shape which assists in the proper positioning of the animal relative to the spraying unit, while at the same time it prevents the animal from blocking or otherwise obstructing the effective spray pattern of the spraying unit.

It is still another object of the instant invention to provide an udder washing apparatus which has a predetermined pattern for the spraying fluid such that the complete exterior surfaces of the individual teats of a dairy animal are completely washed along with the adjacent areas of the udder.

A still further object of the instant invention is to provide an apparatus which not only effectively cleans the mammary area of a dairy animal, but also provides stimulation to the udder to reduce the amount of dwell time of the animal in the milking stall.

Still a further object of the instant invention is to provide a generally improved system for washing and sanitizing dairy animals, which includes a control unit for switching from a washing and stimulating fluid source to a sanitizing fluid source for performing the cleaning as well as sanitizing operation with the same spraying unit.

A still further object of the instant invention is to provide a method for increasing the sanitizing treatment of dairy animals, and particularly provide a pre- and postmilking treatment to insure that the milk received will be free from exterior contamination and that the mammary region of the cow will be free from postmilking infections due to residual milk remaining in exposed portions of the mammary region of the cow after a milking operation.

A still further object of the instant invention is to provide an improved system for cleaning the mammary region of a dairy cow, which includes a provision for adjusting the position of the cleaning element to accommodate various sizes of dairy cows in the same cleaning stall.

In accordance with the present invention, the above-noted features and objects are obtained. Each dairy animal, prior to milking, is subjected to a washing operation. To provide the washing treatment, a spray unit is installed in the floor of a stall in the milking barn. An inlet is provided in the spraying unit for receiving the washing fluid, and the unit itself includes a series of fluid-directing nozzles mounted within a dome-shaped deflecting shell surface in a pattern best suited for directing the washing fluid toward the desired treating area of the animal. The shell presents a generally convex external surface, which deflects the hooves of the animal away from the spraying unit in such a way that the nozzles are not blocked by the hooves of the animal. In one preferred installation, the spraying unit is positioned relative to a feeding container such that as the cow's head is positioned for feeding, the spraying unit is positioned in the normal location beneath the udder of the cow. The shell of spraying unit is approximately the same size as the desired region to be treated and as such causes the cow to straddle the spraying unit. In another type of preferred installation, the spraying unit is mounted on a carriage which is adjustable in position such that the spraying pattern of the spraying unit can be moved to accommodate different sizes of animals.

After the initial washing operation, the cow's udder and teats are generally inspected by the operator prior to the installation of the automatic milking unit. At this time the conventional towel drying of the washed area may be manually performed. After the milking operation has been completed, a control unit changes the operation of valves for the conduits leading up to the fluid intake of the spraying unit to permit a sanitizing fluid under pressure to be directed into the spraying unit from which it is sprayed onto the teats and adjacent udder area providing a final sanitizing treatment which prevents bacteria formation on any residue milk left in the tip of the teats. By designing the nozzle pattern of the spraying unit as well as selecting the temperature and pressures for the spraying operations, it is possible to provide very efficient washing and sanitizing operations which cover the entire exposed area of the teats as well as the adjacent area of the udder, while at the same time providing a desired stimulation of the udder for accelerating the commencement of milking.

These and other features and advantages of the invention will become more clearly apparent from the following detailed description thereof, which is to be read with reference to the accompanying drawings.

BRIEF DESCRIPTION OF THE DRAWINGS

In the drawings:

FIG. 1 is a side elevation view of a typical treating area in which the apparatus and method of the instant invention are employed;

FIG. 2 is an enlarged plan view showing the adjustable embodiment of the treating apparatus of the instant invention;

FIG. 3 is an enlarged end elevation taken in section on lines 3–3 of FIG. 2; and FIG. 4 is a plan view illustrating the spraying pattern of the apparatus of the instant invention.

DESCRIPTION OF THE PREFERRED EMBODIMENTS

Before the significance and advantages of the instant invention can be fully appreciated, a few general remarks concerning the nature of a dairy farm operation are appropriate. Dairy men report that between milkings the dairy animals have a tendency to get dirty and if a milking operation were to be conducted without first cleansing at least the mammary region of the animal, it would not be long before the milk would become contaminated and the herd would become infected and the whole dairy operation would have to cease until proper sanitation standards were met. The dirt that gets on the sides and hooves of the cow is not a particular problem and so previous washing operations which may be effective in removing this dirt are not of much value in producing the santizing required for clean milking operations. For example, it is known that the exterior skin of the teats of a cow should be carefully cleaned so that the suction cups of the milking unit do not become exposed to manure and other residue or dirt which might gather on this portion of the teats and the adjacent portion of the udder. However, it is more important that the very tip end of each individual teat is carefully cleaned since the ducts of the mammary glands open into the channel formed along the interior of the teats rather than pass milk through any membrane on the exterior of the teats. Any dirt, manure or other contaminants that are held in the foreskin or dimple formed in the end of the teat must be removed or otherwise it becomes the first thing sucked into the milking unit. For this reason the instant invention has been developed to insure an effective pattern of washing solution which will not only direct the washing solution around all of the exterior surfaces of the individual teats and the adjacent areas of the udder, but also will direct the washing fluid into the tip ends of the teats for removal of the contaminants in the area.

As shown in FIG. 1 the treating area 2 is provided in the milking barn and includes an animal stall 4 having a floor 6 and a means for positioning the cow 10 in stall 4, such as a feed container 7 mounted on the wall 8. Feed container 7 will generally provide a good reference point for the cow's position since the head 11 of the cow 10, throughout the treating operation, will most likely be in or adjacent to feed container 7. The spraying unit 20 is therefore installed on floor 6 of stall 4 a distance relative to feed container 7 which approximates the distance between the cow's head 11 and her mammary region which includes the udder 16 and the individual teats 17. As shown in FIG. 1, spraying unit 20 is positioned beneath the udder 16, with the cow's left rear hoof 14 positioned on one side of spraying unit 20 and the right rear hoof 13 on the other side of spraying unit 20. This straddling of spraying unit 20 is a natural position for the cow 10 since animal stall 4 is generally narrow in width or there are other cows crowded alongside. In addition, spraying unit 20 includes a deflecting cover 25 having a generally convex exterior surface which deflects the cow's hooves 13 and 14 off of spraying unit 20.

Other structural features of spraying unit 20 are best shown with reference to FIGS. 2 and 3 wherein it is noted that, in addition to the outer shell provided by the deflecting cover 25, there are defined concave nozzle cavities 27 in the exterior surface of spraying unit 20 which in turn define nozzle apertures 28. Individual spray nozzles 23 are positioned within nozzle apertures 28. Although the interior of the spray unit 20 may take on many different shapes, including the possibility of running individual conduits from the fluid inlet 22 to each of the spray nozzles 23, it has been found that a practical configuration providing this connection is obtained by inserting a disc member 30 into the bottom of the deflecting cover 25 to form a fluid chamber 34. Disc member 30 is sealed against the sidewalls of the deflecting cover 25 by inserting between sealing edge 31 and cover 25 as sealing compound such as epoxy or by welding sealing edge 31 of disc member 30 against the interior sidewalls of deflecting cover 25. With this construction the treating fluid enters fluid chamber 34 through fluid inlet 22 and exists fluid chamber 34 through the individual spraying nozzles 23, forming the fluid spray 36 directed upwardly toward the mammary region of cow 10. Although spray nozzles 23 can be formed flush with the convex surface of deflecting cover 25, it has been found that concave nozzle cavities 27 provide additional structural strength to deflecting cover 25.

If a single washing fluid is to be used in the spraying unit 20, it is merely necessary to provide a connection between a pressurized source of the fluid and fluid inlet 22 of spraying unit 20 whenever the washing operation is to take place. As shown in FIG. 2, however, there is provided a preferred fluid supply system 38 which includes a plurality of fluid sources under pressure such as first fluid source 48 and second fluid source 50. These fluid sources are connected through conventional conduits to check valves such as first check valve 42 and second check valve 44 having an ultimate connection through inlet conduit 40 into fluid inlet 22 of spraying unit 20. To provide a stimulation for the animal, fluid sources 48 and 50 may include heating systems (not shown) to raise the fluid temperature above ambient. A control unit 46 may be provided to operate check valves 42 and 44 to permit either the first solution or the second solution to enter into inlet conduit 40 or to turn off all supplies of fluid to inlet conduit 40. It is possible to use a timing system in the control unit 46 to automatically start the washing cycle using the first fluid for a timed interval after the cow is positioned in the animal stall 4. At the end of a milking operation, which may be electrically indicated by means of a connection to the automatic milking unit, a second treating solution may be sprayed through spraying unit 20 to provide a sanitizing or postmilking wash for a perhaps shorter duration. In any event, spraying unit 20 accommodates a large variety of manual, electronic or time controlled operations.

It has been found that by utilization of the instant invention it is possible to perform a treating process previously unknown or considered unpractical, yet producing very desirable sanitizing and efficient milking results. In accordance with this method cow 10 is positioned in the milking stall 4, a spray washing operation is performed by directing a first fluid solution against the mammary region of the animal for a period long enough to provide the desired degree of cleanliness. Simultaneously with the washing operation there is a resultant stimulation of the udder 16 through the use of the first spraying fluid which is not only directed at the individual teats 17 but also at the adjacent udder region 16, with the washing solution being heated to above room temperature, preferably in the range between 100° and 130° F. It has also been found that a pressure of approximately 20 to 40 p.s.i. at inlet 22 of spraying unit 20 provides an adequate washing and stimulation cycle for most cows having the duration between 10 and 30 seconds. At the end of this initial treatment the cow is ready to "let down," that is ready to begin milking. At this time the conventional milking operation is performed utilizing whatever automatic milking or manual milking equipment is necessary. As soon as the milking operation is completed, with the milking unit removed, a second fluid in the form of a sanitizing solution is sprayed from spraying unit 20 against the udder 16 and teats 17 for a much shorter interval such as 2 to 10 seconds for the purpose of reducing the development of bacteria that might form on any residual drops of milk exuding from the tips of the individual teats 17. Many of the conventional or yet-to-be-developed sanitizing solutions can be used for this purpose. The result of the practice of this method is that the mammary region which is required to be clean prior to milking becomes adequately clean, while at the same time the cow is stimulated into starting a quicker milking operation which results in a shorter duration of the cow's stay in the milking barn. In addition, the final sanitizing treatment assists in the reduction of harmful diseases. This method also permits the use of previously known techniques of injecting a lubricant into the washing solution which prevents chapping and other skin irritation around the teats of the cow.

In small dairy operations it is not unusual to find that the cows are not of any particular uniform dimension between their head and their mammary region. To accommodate the various sizes of cows that might be in any one milking herd, an additional bit of structure is added to spraying unit 20 shown in FIG. 1 to include a carriage plate 53 upon which deflecting cover 25 is securely mounted, as shown in FIGS. 2 and 3. A weld seam 54 may be used to join deflecting cover 25 to the generally horizontally extending carriage plate 53. Carriage plate 53 slides along the upper surface of a support plate 58 which is mounted upon the stall floor 6 and spaced from the stall floor 6 by means of center support 59 and side edge flanges 60. The side edges of the carriage plate 53 terminate in a downwardly and inwardly directed channel edge 56 which is shaped to slide along the shoulder 61 formed in the upper side edge of support plate 58 and flange 60. In operation the operator merely pushes the deflecting cover 25 or the carriage plate 53 along the support plate 58 until spraying unit 20 is properly positioned beneath udder 16 of cow 10.

Of particular importance in providing the necessary cleaning of the tip end of the teats 17 along with their exterior surfaces and the adjacent surfaces of udder 16, is the spray pattern 36 produced by spray nozzles 23. Pattern 36 is best shown in FIG. 4, wherein the exterior surface of teats 17 as shown in dashed lines as they are lined up above spray nozzles 23 positioned within deflecting cover 25 of spraying unit 20. As shown, pattern 36 of the fluid sprays is formed so that all the exterior surfaces as well as the tip ends of the individual teats 17 are exposed to some portion of the fluid sprays.

It is therefore seen that by the use of the apparatus and method of the instant invention it is possible to reduce the amount of time required for milking a dairy animal while at the same time increasing the sanitized condition of the mammary portion of the animal.

I claim:

1. A dairy animal udder treatment unit for mounting upon an animal-supporting floor comprising:
   means for receiving fluid under pressure, said means deflecting animal hooves away from said unit by having a generally convex-shaped exterior surface;
   means defining within said deflecting means a plurality of apertures;
   nozzle means for directing said fluid under pressure from said receiving means out through said apertures; and
   said deflecting means being of a size to separate the hooves of an animal over said udder treatment unit whereby the animal's udder is exposed to fluid discharged from said nozzle means.

2. The spraying unit of claim 1 wherein said deflecting means defines a plurality of concave indentations for containing said means defining said apertures and reinforcing said deflecting means.

3. The spraying unit of claim 1 including means defining a disc member sealed along the inside surface of the lower portion of said deflecting means for establishing a fluid chamber communicating said inlet means with said apertures.

4. The spraying unit of claim 1 including:
   means defining a carriage plate securely fixed to the lower edge of said deflecting means; and
   means defining a support plate positioned on the floor and formed to provide sliding support for said carriage plate and said deflecting means.

5. The spraying unit of claim 1 including:
   a first fluid source under pressure;
   a second fluid source under pressure; and
   valve and conduit means for selectively connecting said first and second fluid sources with said receiving means.

6. The spraying unit of claim 5 wherein said valve means include check valves for preventing flow of fluid from said first source from flowing into said second source and fluid from said second source from flowing into said first source.

7. A means for spraying fluid toward a desired region on the underside of an animal's body comprising:
   an animal stall including an animal-supporting floor and means for locating one portion of the animal's body;
   a spraying unit supported on said stall floor in a predetermined position relative to said locating means beneath the region of said animals to be treated;
   said spraying unit including a means for receiving fluid under pressure, said means directing said fluid under pressure in a predetermined pattern and said means having a generally convex surface for deflecting the animal's hooves from said fluid directing means; and
   said deflecting means defining an exterior surface having nozzle means through which said projecting fluid passes with the width of said dome substantially equal to the width of the animal region being treated by said fluid.

8. The spraying means of claim 7 wherein said dome surface includes means defining concave pockets for adding structural strength to said deflecting means and for locating said fluid directing means.

9. The spraying means of claim 7 including fluid supply means having a plurality of fluid sources under pressure and valve means for selectively communicating said fluid sources with said fluid receiving means.

10. The fluid spraying means of claim 9 wherein at least one of said fluid sources includes means for heating its fluid to a temperature above ambient temperature.

11. The fluid spraying means of claim 10 including control means having means for sensing the termination of milking and means for operating said valve means after the termination of milking to permit one of said fluid sources to be in communication with said fluid receiving means for a predetermined treatment period with said fluid.

12. The fluid spraying means of claim 7 wherein said region is the udder including the teats of a milk-producing animal.

13. The fluid spraying means of claim 7 wherein said pattern is selected to cover all exterior surfaces of the animal's teats and the udder surfaces adjacent thereto.

14. The fluid spraying means of claim 7 including means supported by said floor for defining a path for guiding said spraying unit along said path for adjusting its position relative to said locating means.

15. The fluid spraying means of claim 7 wherein said spraying unit includes means defining a fluid chamber for communicating said fluid receiving means with said fluid directing means.